(No Model.)
C. E. SCRIBNER & G. D. CLARKE.
CARBON OF TELEPHONE TRANSMITTERS.
No. 252,296. Patented Jan. 10, 1882.
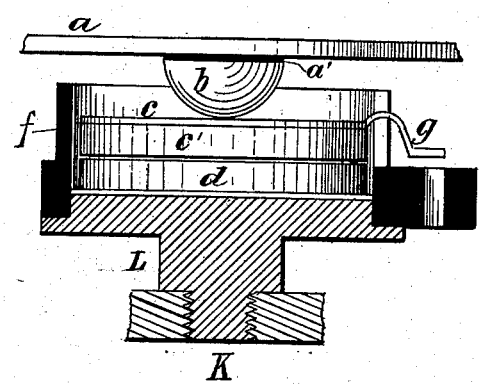
Witnesses
W. C. Coolies
James L. Baird
Inventors
Charles E. Scribner
And
George D. Clarke
By George P. Barton
Attorney

UNITED STATES PATENT OFFICE.

CHARLES E. SCRIBNER AND GEORGE D. CLARKE, OF CHICAGO, ILLINOIS, ASSIGNORS TO THE WESTERN ELECTRIC MANUFACTURING COMPANY, OF SAME PLACE.

CARBON OF TELEPHONE-TRANSMITTERS.

SPECIFICATION forming part of Letters Patent No. 252,296, dated January 10, 1882.

Application filed October 18, 1880. (No model.) Patented in England November 29, 1879.

*To all whom it may concern:*

Be it known that we, CHARLES E. SCRIBNER and GEORGE D. CLARKE, citizens of the United States, and residents of Chicago, in the county of Cook and State of Illinois, have invented certain new and useful Improvements in the Carbons of Telephone-Transmitters, of which the following is a full, clear, concise, and exact description, reference being had to the accompanying drawing, forming a part of this specification.

Our invention consists in providing a roughened surface which rests in contact with the soft carbon button. The soft carbon is placed in the rubber cup, with its lower surface resting upon a metallic surface, usually of platinum. Prior to our invention the upper surface of the carbon was placed in contact with the lower surface of a metallic disk.

In carbon-transmitters the best results are obtained when this upper surface of the soft carbon is slightly roughened. The roughened surface which produces the best results has been compared to a surface of velvet, which may be formed by light strokes of a fine brush. When used in combination with a metallic disk placed above it this velvety or roughened surface is soon destroyed, and becomes smooth and covered with a thin glossy scale.

We have discovered that a disk of hard carbon substituted for the metallic disk will keep the surface of the soft carbon in the proper condition. It is not absolutely necessary to use the brush, as the surface of hard carbon, when placed in contact with the soft carbon, soon produces a surface of the required properties.

The surface of hard carbon should be made perfectly true, in order that its every point may find contact with the upper surface of the soft-carbon button.

We true or level the hard carbon by friction preferably against emery-paper. We electroplate the upper surface of the hard carbon preferably with copper.

In the drawing, the figure is a section of the interior parts of a carbon-telephone embodying our improvements.

The diaphragm $a$ is insulated, by insulating substance $b'$, from the point $b$, which rests upon the copper surface $c$ of the hard carbon $c'$.

We find it most convenient to insulate the hemisphere $b$ by japanning the diaphragm in the usual manner. The soft-carbon button $d$ is placed within the rubber cup $f$ in the usual manner, and the circuit passes in the usual manner from the frame K and bed-piece L through the carbons, and, by conductor $g$, to a binding-post provided in the usual manner upon the frame of the telephone.

The hard carbon referred to posseses the characteristics or properties of the carbon used in batteries. The soft carbon may be made of lamp-black, and the buttons of soft carbon may be formed in a press, enough pressure being applied to cause the buttons to retain their form when handled with care.

We claim—

1. In a carbon-telephone, the combination of a piece of hard carbon with the button of soft carbon, the hard carbon being provided with a true surface, which is in contact with the soft carbon, the hard-carbon and soft-carbon buttons thus combined forming the contact-electrodes or medium of variable resistance, as and for the purpose set forth.

2. In a telephone-transmitter, the combination of a piece of hard carbon, with its upper surface coated with metal, and the button of soft carbon, and the diaphragm, the piece of hard carbon and the button of soft carbon having surfaces in contact and forming the contact-electrodes, substantially as and for the purpose specified.

CHARLES E. SCRIBNER.
GEORGE D. CLARKE.

Witnesses:
GEORGE P. BARTON,
WALLACE L. DE WOLF.